United States Patent [19]

Chiu

[11] Patent Number: 5,743,543
[45] Date of Patent: Apr. 28, 1998

[54] BICYCLE

[76] Inventor: Ping-Jan Chiu, No. 1146, Chung-Shan Rd., Ta-Chia Chen, Taichung Hsien, Taiwan

[21] Appl. No.: 661,137

[22] Filed: Jun. 10, 1996

[51] Int. Cl.⁶ ................................................. B62K 27/00
[52] U.S. Cl. ............................................. 280/231; 280/239
[58] Field of Search ................................. 280/230, 231, 280/239, 204, 287

[56] References Cited

U.S. PATENT DOCUMENTS

| 3,608,917 | 9/1971 | Cogliano | 280/231 |
| 5,022,672 | 6/1991 | Kawai | 280/287 |
| 5,067,738 | 11/1991 | O'Connor | 280/231 |
| 5,222,751 | 6/1993 | Chen | 280/287 |
| 5,421,597 | 6/1995 | Berner | 280/204 |

*Primary Examiner*—Ed L. Swinehart
*Attorney, Agent, or Firm*—Sterne, Kessler, Goldstein & Fox P.L.L.C.

[57] ABSTRACT

A bicycle includes a first bicycle body, a connecting frame and a second bicycle body. The first bicycle body includes a vertical seat post for mounting a seat, and a first joint member provided on the seat post. The connecting frame extends longitudinally and rearwardly from the first bicycle body, and has a front end with a second joint member to be releasably connected to the first joint member, and a rear forked end with a pair of separate first connecting portions. The second bicycle body includes a top tube and a bottom tube, both of which respectively have ends forming second connecting portions. The second connecting portions are respectively connected to the first connecting portions. The first connecting portions are fastened to the second connecting portions.

4 Claims, 6 Drawing Sheets

BICYCLE

BACKGROUND OF THE INVENTION

1. Field of the Invention

This invention relates to a bicycle, more particularly to a bicycle having a detachable rear portion that can be reassembled with ease.

2. Description of the Related Art

A typical tandem bicycle is composed of three serially aligned wheels which carry a long frame to support two seats. Since the long frame as constructed conventionally is not readily separable, it is inconvenient to store or to carry the same when in a pleasure trip. Moreover, the seats of the tandem bicycle are generally designed for adults, making it difficult for a child to ride with an adult.

SUMMARY OF THE INVENTION

Therefore, the objective of the present invention is to provide a bicycle of separable type for convenient storage and transport.

According to this invention, a bicycle includes a first bicycle body, a connecting frame, and a second bicycle body. The first bicycle body includes a vertical seat post for mounting a seat, and a first joint member which is provided on the seat post. The connecting frame extends longitudinally and backwardly from the first bicycle body, and has a front end with a second joint member to be releasably connected to the first joint member of the first bicycle body, and a rear forked end with a pair of separate first connecting portions. The second bicycle body includes a top tube and a bottom tube, both of which respectively have ends forming second connecting portions. The second connecting portions are respectively connected to the first connecting portions. Fastening means is provided for fastening the first connecting portions to the second connecting portions, respectively.

BRIEF DESCRIPTION OF THIS DRAWINGS

Other features and advantages of the present invention will become apparent in the following detailed description of a preferred embodiment of the invention, with reference to the accompanying drawings, in which.

DETAILED DESCRIPTION OF THE PREFERRED EMBODIMENT

Figure 1:
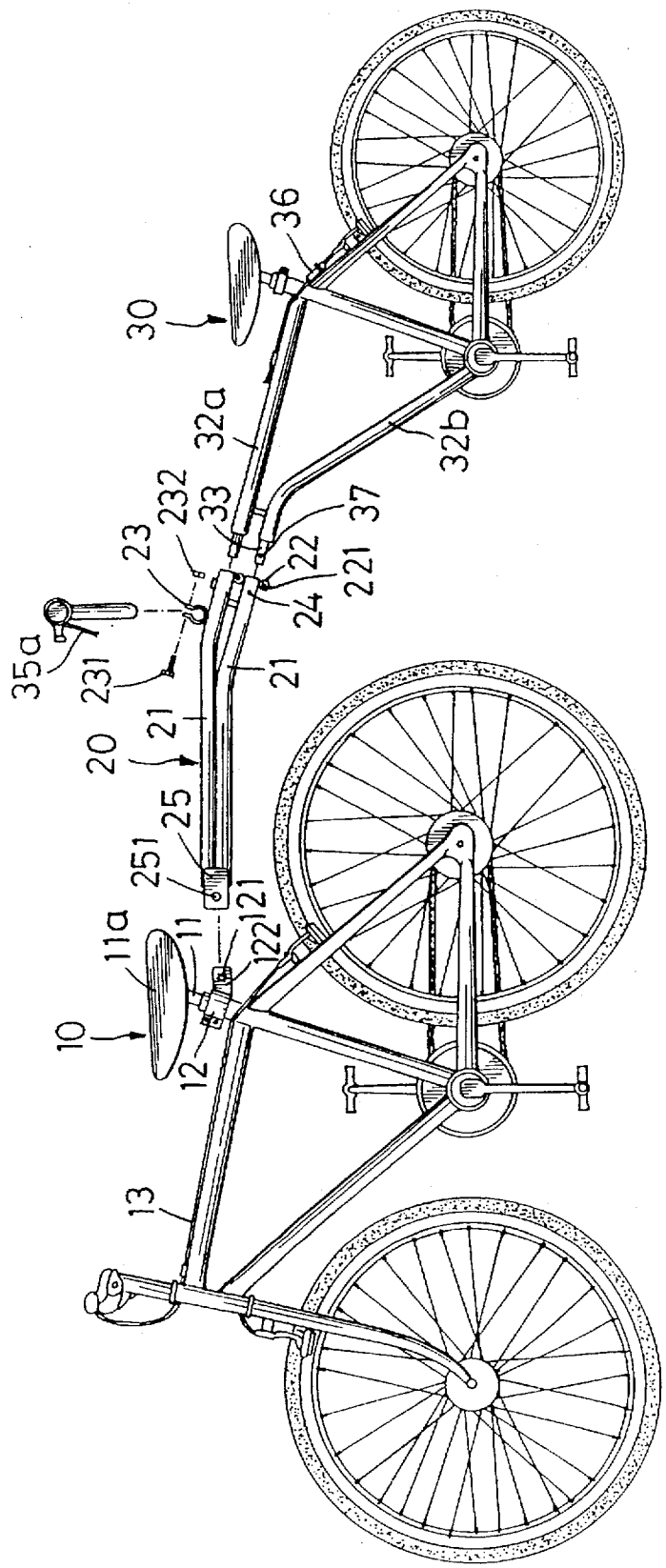
FIG. 1 is a partly exploded plan view of a bicycle of a preferred embodiment according this invention, wherein some portions are shown to be separated.
Figure 2:
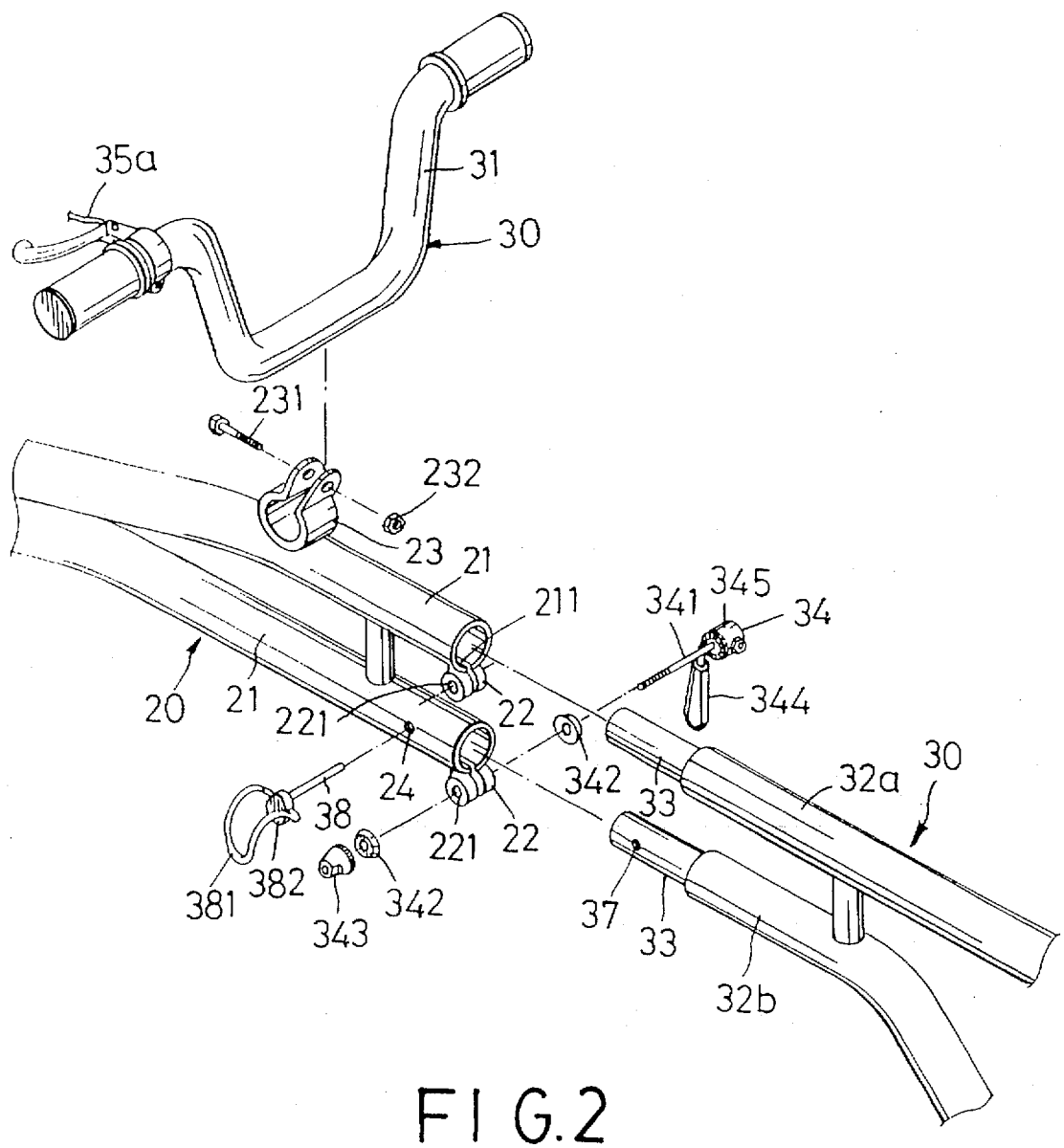
FIG. 2 is an exploded perspective view, illustrating a portion of the embodiment in more detail.
Figure 4:
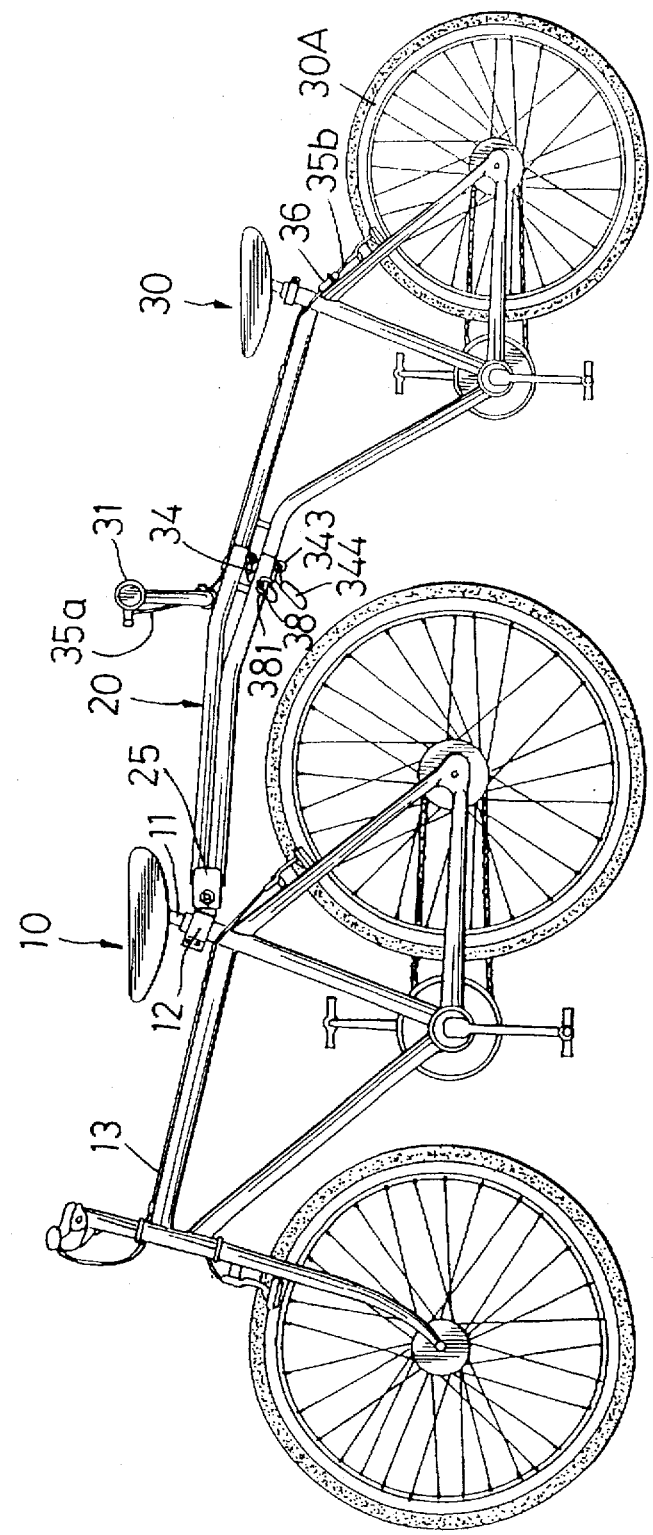
FIG. 4 is a plan view of the preferred embodiment, illustrating the tandem bicycle after assembly.

Referring to FIG. 4 in combination with FIGS. 1 and 2 which illustrate the preferred embodiment of a tandem bicycle according to this invention in a separated state, the preferred embodiment is shown to comprise a first bicycle body 10, a connecting frame 20 and a second bicycle body 30.

The first bicycle body 10 includes a conventional bicycle frame which has a seat post 11 for mounting a seat 11a. A first joint member includes a fastening block 12 which is sleeved on mounted to the seat post 11. The fastening block 12 has a projecting portion 122 which extends rearwardly and which is formed with a hole 121.

The connecting frame 20 extends longitudinally and rearwardly from the first bicycle body 10. The connecting frame 20 has a front end with a second joint member in the form of a connecting plate 25 that has an insert hole 251 to releasably connect with the fastening block 12 of the first bicycle 10 by means of a screw (not shown) which passes through the hole 121 in the fastening block 12 and the insert hole 251 in the connecting plate 25. Moreover, the connecting frame 20 has a rear end which is forked to form a pair of separate first connecting portions, each having a sleeve end 21. Each sleeve end 21 has a C-shaped cross section that forms a longitudinal slit 211 (see FIG. 2) and is formed with a pair of lugs 22 that project radially and outwardly from the sleeve ends 21 on two sides of the slit 211. Each pair of the lugs 22 has an axial hole 221.

The second bicycle body 30 includes a top tube 32a and a bottom tube 32b which respectively have second connecting portions with insert ends 33. The insert ends 33 are respectively inserted into the sleeve ends 21. The fastening means is provided to fasten firmly the sleeve ends 21 to the insert ends 33. Fastening means includes two clamps 34 (only one clamp 34 is shown) and one locking pin 38.

Figure 3:
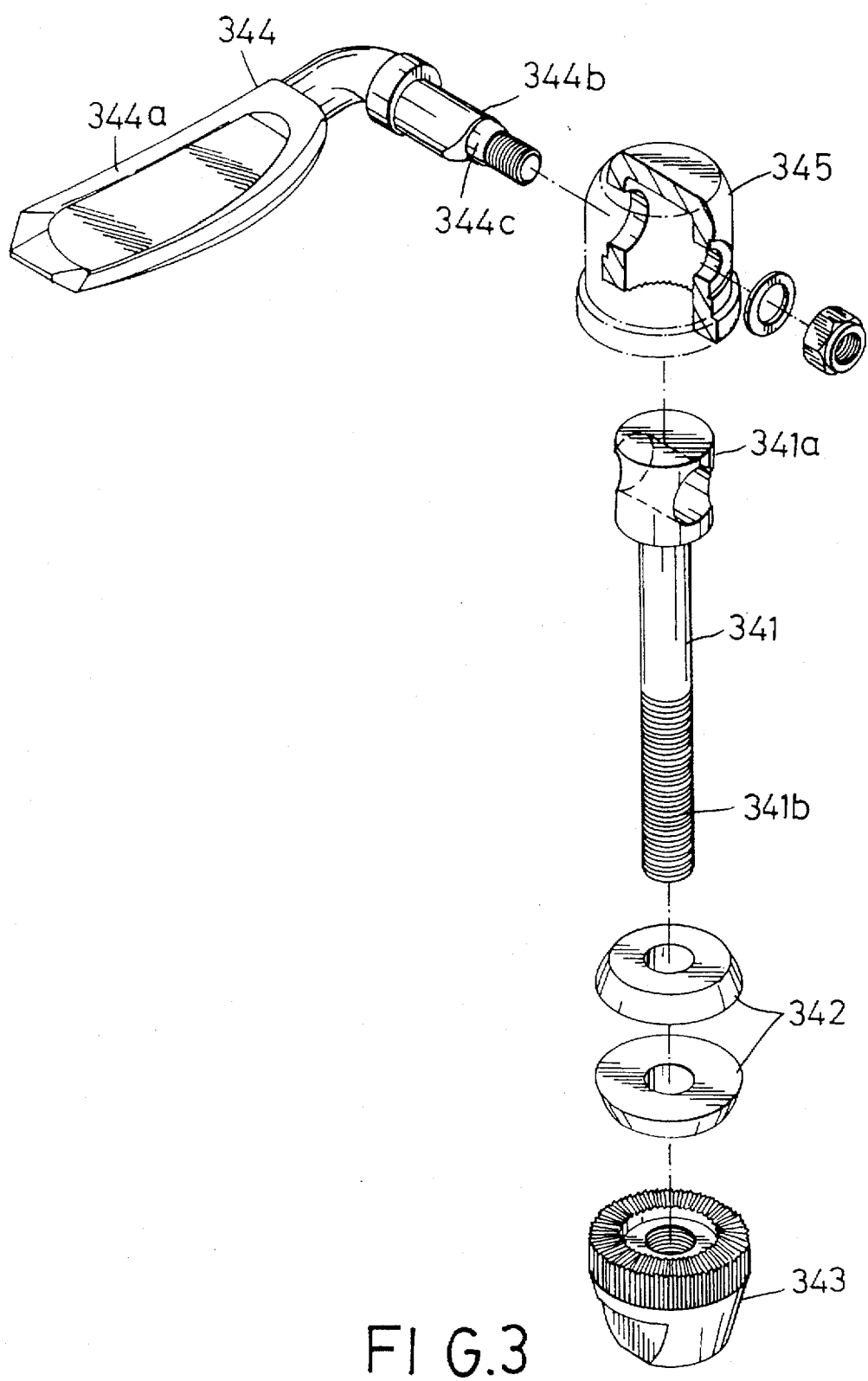
FIG. 3 is an exploded view of a clamp used in the preferred embodiment.

As shown in FIG. 3, the clamp 34 includes a bolt 341 which has a headed end 341a and a threaded end 341b. A nut 343 is sleeved on the bolt 341 to engage the threaded end 341b. Two washers 342 are provided on two sides of lugs 22 between the headed end 341a and the threaded end 341b of the bolt 341. A cap 345 encloses the headed end 341a. An L-shaped operating member 344 has a lever portion 344a and a shaft portion 344b. The shaft portion 344b rotatably passes through the headed end 341a and the cap 345, and has an eccentric protrusion 344c. The lever portion 344a can be turned between 0°–180°, and the eccentric protrusion 344c cams the cap 345 toward or away from the nut 343 when the lever portion 344a turned. The bolt 341 passes through the axial holes 221 of the lugs 22. When the nut 343 is tightened, the lugs 22 are clamped between the two washers 342. Thus, the sleeve end 21 is fastened tightly to the insert end 33.

The locking pin 38 has a knob 382. A pin positioning unit 381 is hinged to the knob 382 of the locking pin 38. After the locking pin 38 is caused to pass through the sleeve end 21 and the insert end 33, the pin positioning unit 381, which has a curved configuration, can be folded to abut against the outer peripheral surface of the sleeve end 21 to function with the locking pin 32 as a clip.

Referring again to FIG. 2, the connecting frame 20 further includes a mounting clamp 23 having a substantially C-shaped cross-section, a threaded bolt 231 and a nut 232. A handle 31, which is held by the mounting clamp 23, is to be employed by one riding the second bicycle body 30.

Figure 5:
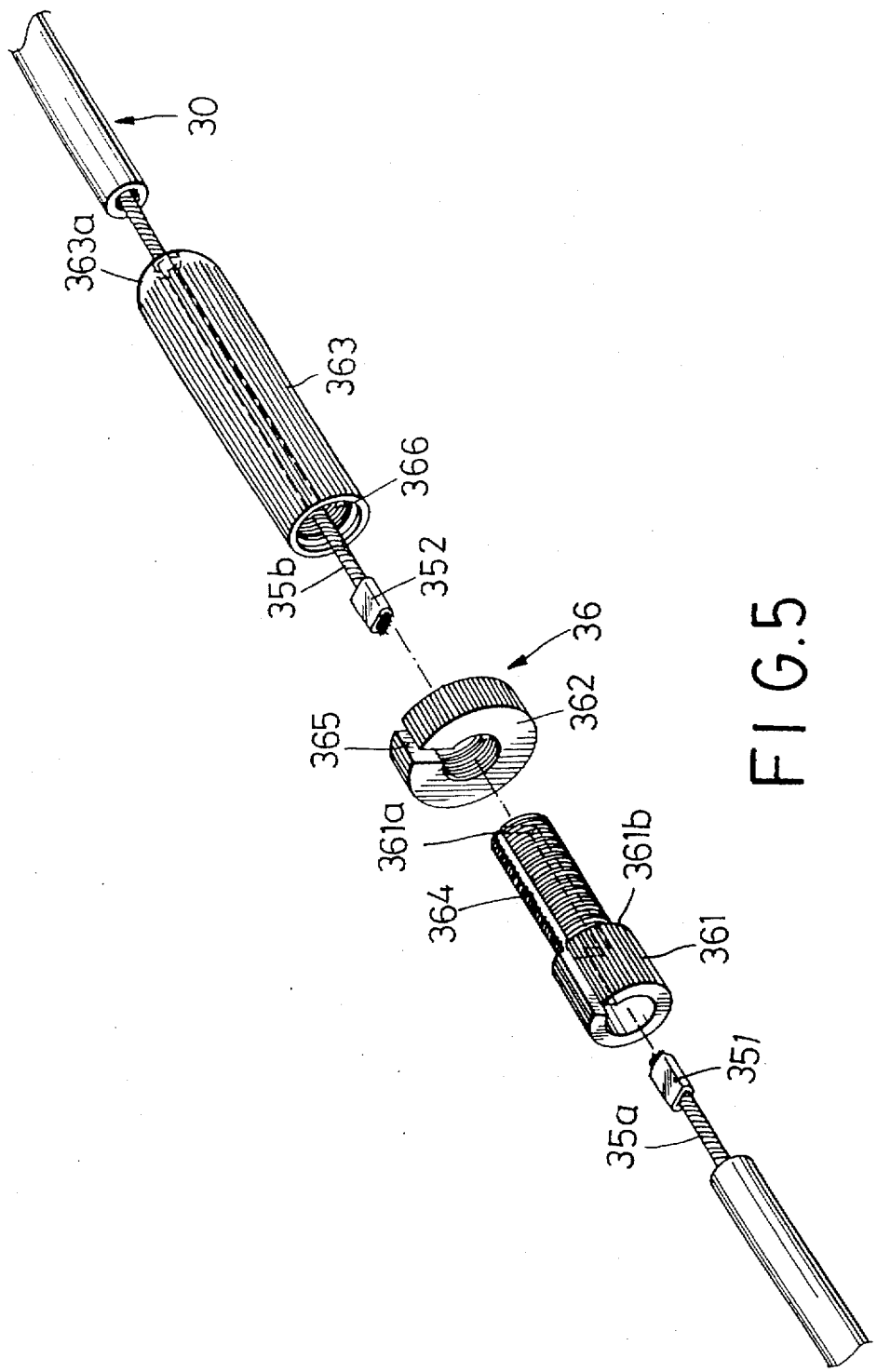
FIG. 5 is an exploded view of a coupling mechanism used in the preferred embodiment.

In addition, referring to FIGS. 2, 4 and 5, the tandem bicycle further includes a first brake cable 35a which is connected to the handle 31 and which has a first stop member 351 on its end, a second brake cable 35b which extends to a rear wheel 30A of the second bicycle body 30 and which has a second stop member 352 on its end, and a coupling mechanism 36 which connects the first brake cable 35a and the second brake cable 35b. The coupling mechanism 36 includes a first sleeve 361, a nut 362 and a second sleeve 363. The first sleeve 361 has a longitudinally extending slit 364 for insertion of the first brake cable 35a in a radial direction, and an end 361a to prevent the first stop member 351 from being released from the first sleeve 361. The nut 362 surrounds the first sleeve 361 and has a slit 365 in alignment with the slit 364. The second sleeve 363 has a threaded portion 366 to engage the threaded portion of the first sleeve 361, and an end 363a to retain the second stop member 352. The first brake cable 35a and the second brake cable 35b are connected together when the second sleeve 363 is threadedly sleeved on the first sleeve 361. The nut 362 locks movement of the second sleeve 363 relative to the first sleeve 361, and can be located at any distance from the shoulder 361b of the first sleeve 361. By adjusting the distance, the total length of the coupling mechanism 36 can be changed, and the tension of the brake cable can be adjusted.

Figure 6:
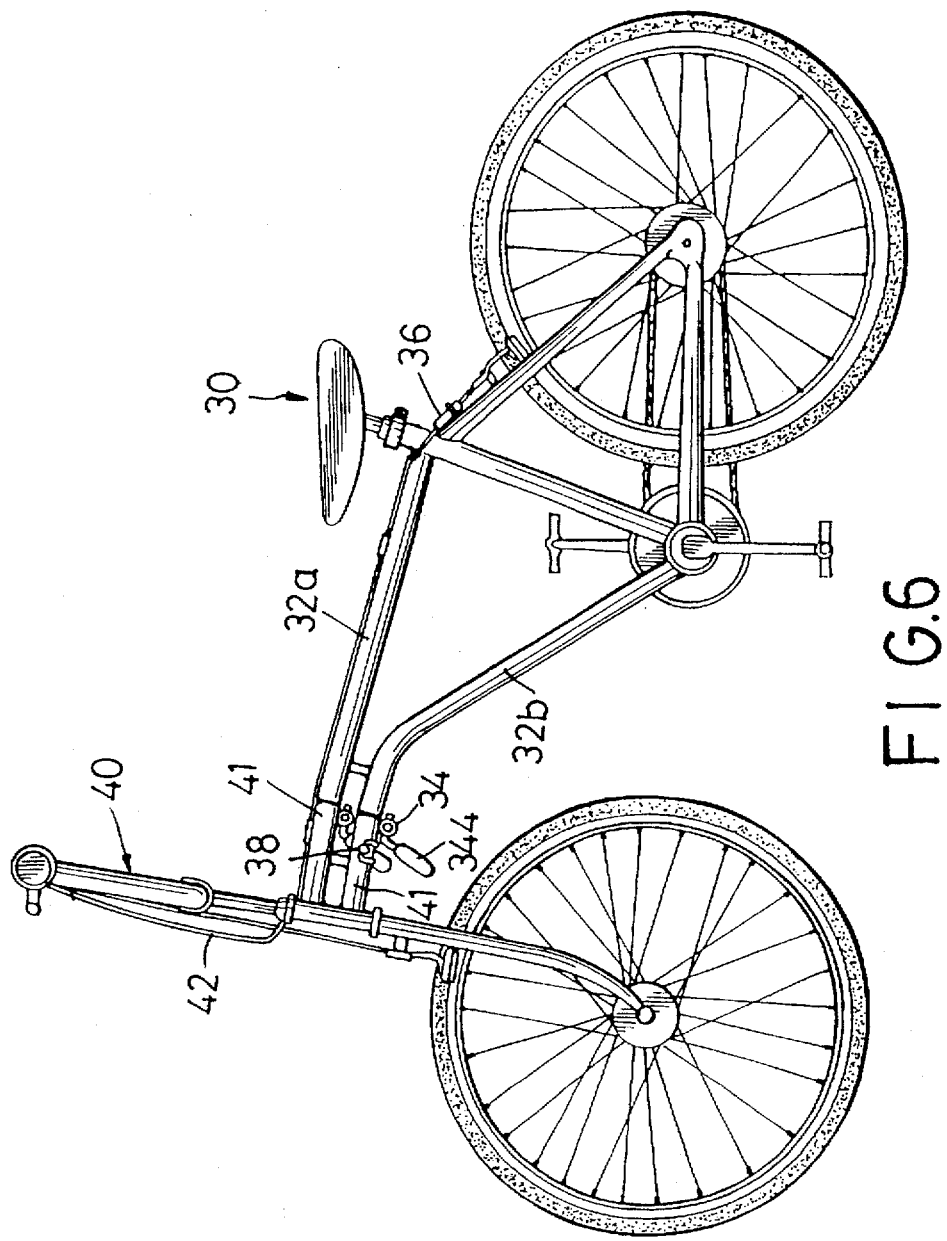
FIG. 6 illustrates a two-wheel bicycle which incorporates the present invention.

FIG. 6 shows a two-wheel bicycle, wherein elements similar to those described beforehand are denoted by like reference numerals. The bicycle comprises a bicycle frame portion 30 and a front tube 40 which is connected to two sleeve portions 41 that extend rearwardly. The top and bottom tubes 32a and 32b of the frame body 30 are respectively connected to sleeve portions 41 with the use of clamps 34 in a manner similar to that mentioned hereinabove.

As mentioned above, the first bicycle body 10 and the second bicycle body 30 can be assembled or disassembled quickly by virtue of the clamps 34 and the locking pin 38. Due to this separable construction, the tandem bicycle can be easily separated and stored or transported conveniently. Although the second bicycle body 30 as shown is designed for a child, it can be replaced with one which has a size suitable for an adult. The invention is also advantageous due to such exchangeability.

While the present invention has been described in connection with what is considered the most practical and preferred embodiment, it is understood that this invention is not limited to the disclosed embodiment but is intended to cover various arrangement included within the spirit and scope of the broadest interpretations and equivalent arrangements.

I claim:

1. A bicycle comprising:

a first bicycle body including a vertical seat post for mounting a seat, and a first joint member which is provided on said seat post, said first joint member including a fastening block which is sleeved on said seat post, and a projecting portion which extends rearwardly from said fastening block;

a connecting frame extending longitudinally and rearwardly from said projection portion, said connecting frame having a front end with a second joint member to be releasably connected to said projecting portion, and a rear forked end with a pair of separate first connecting portions, said second joint member of said connecting frame being pivoted to said projecting portion of said first joint member;

a second bicycle body including a top tube and bottom tube, both of which respectively have ends forming second connecting portions, said second connecting portions being respectively connected to said first connecting portions; and fastening means for fastening said first connecting portions to said second connecting portions.

2. A bicycle as claimed in claim 1, wherein said connecting frame further comprises a mounting clamp secured thereto and a handle held by said mounting clamp.

3. A bicycle comprising:

a first bicycle body including a seat post for mounting a seat, and a first joint member which is provided on said seat post;

a connecting frame extending longitudinally and rearwardly from said first bicycle body, said connecting frame having a front end with a second joint member to be releasably connected to said first joint member of said first bicycle body, and a rear forked end with a pair of separate first connecting portions, each of said first connecting portions having a sleeve end with a C-shaped cross section, said sleeve end having a longitudinal slit and a pair of lugs projecting radially and outwardly from said sleeve end on two sides of said slit, each of said lugs having an axial hole;

a second bicycle body including a top tube and a bottom tube, both of which respectively have ends forming second connecting potions, said second connecting portions being respectively connected to said first connecting portions, each of said second connecting portions having an insert end for insertion into said sleeve ends of said first connecting portions, and fastening means for clamping together said first and second connecting portions, said fastening means having two clamps, each of which clamps tightly said pair of said lugs, said fastening means further having a locking pin which has a knob and which passes through said sleeve end of the respective one of said first connecting portions and said insert end of the respective one of said second connecting portions, and a pin positioning unit hinged to said knob of said locking pin, said pin positioning unit having a curved configuration and being foldable to abut against said sleeve end and to function with said locking pin as a clip.

4. A bicycle as claimed in claim 3, wherein said clamp includes a bolt which has a headed end and a threaded end, a nut which engages said threaded end, a cap which encloses said headed end, and an L-shaped operating member which has a lever portion and a shaft portion, said shaft portion rotatably passing through said headed end and said cap and having an eccentric protrusion to cam said cap toward or away from said nut, said bolt passing through said axial holes of said lugs, said nut and said cap releasably clamping said lugs.

* * * * *